United States Patent [19]

Ihara et al.

[11] Patent Number: 5,262,248
[45] Date of Patent: Nov. 16, 1993

[54] SOFT MAGNETIC ALLOY FILMS

[75] Inventors: Keita Ihara, Katano; Hiroshi Sakakima, Hirakata; Koichi Osano, Sakai, all of Japan

[73] Assignee: Matsushita Electric Industrial Co., Ltd., Osaka, Japan

[21] Appl. No.: 870,092

[22] Filed: Apr. 16, 1992

Related U.S. Application Data

[63] Continuation of Ser. No. 613,987, Nov. 15, 1990, abandoned.

[30] Foreign Application Priority Data

Nov. 17, 1989 [JP] Japan .................. 1-300506
Jul. 26, 1990 [JP] Japan .................. 2-200501

[51] Int. Cl.$^5$ ............ H01F 1/147; B32B 5/14; B32B 15/00
[52] U.S. Cl. .................. 428/610; 428/611; 428/681; 428/928; 428/694; 148/306
[58] Field of Search ............ 428/694, 611, 606, 610, 428/681, 928; 148/403, 313, 306

[56] References Cited

U.S. PATENT DOCUMENTS 4,835,069 5/1989 Sawada et al. .............. 428/694
4,836,865 6/1989 Sakakima et al. .............. 148/306

Primary Examiner—Michael Lewis
Assistant Examiner—Valerie Ann Lund
Attorney, Agent, or Firm—Wenderoth, Lind & Ponack

[57] ABSTRACT

The soft magnetic alloy film of the present invention is not a simple nitride alloy film but incorporates a compositional modulation in which at least the content of nitrogen is periodically modulated in the direction of film thickness after the deposition of the alloy film by a sputtering procedure. Also, the soft magnetic alloy film of the present invention contains a main content of Fe for providing higher saturation magnetization, one or more metals selected from Nb, Ta, Zr, Ti, and Hf, and fine grains of Fe based materials developed after annealing. Therefore, the soft magnetic alloy film of the present invention can exhibit better magnetic properties including higher saturation magnetization and improved soft magnetic characteristics after the annealing and also, ensuring minimum magnetostriction with a specific composition.

2 Claims, 8 Drawing Sheets

SOFT MAGNETIC ALLOY FILMS

This application is a continuation of now abandoned application Ser. No. 07/613,987 filed on Nov. 15, 1990.

BACKGROUND OF THE INVENTION

1. Field of the Invention

The present invention relates to films of soft magnetic Fe based alloy containing nitrogen for use as materials of a magnetic head core for e.g. a VCR or a hard disk system.

2. Description of the Prior Art

It is known that typical soft magnetic alloys for use with e.g. a magnetic head include cobalt amorphous alloy and Fe-Al-Si alloy. As higher density in the magnetic recording has been much required, such a soft magnetic alloy for use as a material of a core is now intended to provide higher magnetic saturation.

It is also desired to form magnetic gaps with e.g. bonding glass for enhancing the operational reliability of the magnetic head of a VCR or hard disk. The bonding glass exhibiting a greater bonding strength is high in the melting point and thus, the soft magnetic alloy film should have a better soft magnetic property and higher saturation magnetization after the heat treatment at a high temperature. For example, for producing a soft magnetic alloy film having higher saturation magnetization from a Co based amorphous alloy, it is required to decrease the content of a glass forming element in the alloy. However, the temperature for crystallization in the amorphous alloy film is also decreased, whereby the soft magnetic property after annealing will be declined. In view of thermal stability of the soft magnetic property, the practical saturation magnetization in a soft magnetic alloy film for a magnetic head in e.g. a VCR is about 10 k Gauss at the maximum when a Co based amorphous alloy or Fe-Al-Si alloy is employed.

As understood, for ensuring the thermal stability in the soft magnetic property, the practical saturation magnetization in the soft magnetic alloy film for e.g a VCR magnetic head is about 10 k Gauss at the maximum. However, an improved soft magnetic alloy film having higher saturation magnetization is now required for use with a high density recording head.

The compositionally modulated nitride alloy films developed by us (for example, disclosed in U.S. patent Ser. No. 4836865) are known, in which the nitrogen composition is modulated in the direction of film thickness, as appropriate materials for magnetic heads which can exhibit higher saturation magnetization and has a better soft magnetic property developed after annealing. Such a compositionally modulated nitride alloy film exhibits higher saturation magnetization with mainly Fe based alloy than with Co based alloy and also, less costly. It is therefore advantageous to produce the soft magnetic film with a compositionally modulated Fe based nitride alloy for having a better soft magnetic property and exhibiting improved thermal stability. Accordingly, the compositionally modulated Fe based nitride alloy film should be described in more details of the compositional arrangement or general formula and simultaneously, proved to provide lower magnetostrictive effects.

It is a primary object of the present invention to provide a soft magnetic alloy film for use with a magnetic head, which has a better soft magnetic property developed after annealing and exhibiting higher saturation magnetization, with the use of Fe based alloy, not conventional nitride films, having a compositional modulation of nitrogen. It is another object of the present invention to provide a soft magnetic alloy film for use with a magnetic head, which has a better soft magnetic property ensuring lower magnetostriction and also, can exhibit lower magnetostriction after annealing, with the use of compositionally modulated Fe based nitride alloy films.

SUMMARY OF THE INVENTION

For achievement of the aforementioned object, a soft magnetic alloy film is provided, and the composition of the film has been modulated in the direction of film thickness at least during the deposition of the alloy film and the average composition of the film is represented by the general formula, $$M_a T_b N_c \quad (1)$$

where M is Fe, T is one or more metals selected from Nb, Ta, Zr, Ti, and Hf, N is nitrogen, and a, b, and c are numerals in atomic % and determined by:

$$65 \leq a \leq 89.3, 3 \leq b \leq 17, 4 \leq c\, 20 \quad (1')$$
$$a + b + c = 100.$$

Also, there is provided a soft magnetic alloy film containing fine grains of Fe based materials in which at least the nitrogen composition is modulated in the direction of film thickness and the average composition of the film is represented by the general formula, $$M_a T_b N_c \quad (1)$$

where M is Fe, T is one or more metals selected from Nb, Ta, Zr, Ti, and Hf, N is nitrogen, and a, b, and c are numerals in atomic % and determined by:

$$65 \leq a \leq 89.3, 3 \leq b \leq 17, 4 \leq c\, 20 \quad (1')$$
$$a + b + c = 100.$$

Particularly for ensuring lower magnetostrictive effects, there is provide a soft magnetic alloy film, the composition of which has been modulated in the direction of film thickness at least during the deposition of the alloy film and the average compositional arrangement in the layers is represented by the general formula, $$M_d X_e Z_f N_g \quad (2)$$

where M is Fe, X is one or more metals selected from Nb and Ta, Z is one or more metals selected from Zr, Ti, and Hf, N is nitrogen, and d, e, f, and g are numerals in atomic % and determined by:

$$68 \leq d \leq 82, 9 \leq e \leq 15, 0 \leq f \leq 3, 4 \leq g \leq 20, \quad (2')$$
$$d + e + f + g = 100.$$

Also, the same effects will be given by a soft magnetic alloy film containing fine grains of F based materials in which at least the nitrogen composition is modulated in the direction of film thickness and the average composition of the film is represented by the general formula, $$M_d X_e Z_f N_g \quad (2)$$

where M is Fe, X is one or more metals selected from Nb and Ta, Z is one or more metals selected from Zr, Ti, and Hf, N is nitrogen, and d, e, f, and g are numerals in atomic % and determined by:

$$68 \leq d \leq 82, 9 \leq e \leq 15, 0 \leq f \leq 3, 4 \leq g \leq 20, \quad (2')$$
$$d + e + f + g = 100.$$

Similarly, for ensuring lower magnetostrictive effects, a soft magnetic alloy film is provided, and the composition of the film has been modulated in the direction of film thickness at least during the deposition of the alloy film and the average composition of the film is represented by the general formula, $$M_hX_iZ_jN_k \quad (3)$$

where M is Fe, X is one or more metals selected from Nb and Ta, Z is one or more metals selected from Zr, Ti, and Hf, N is nitrogen, and h, i, j, and k are numerals in atomic % and determined by:

$$65 \leq h \leq 89.3, 0 \leq i \leq 5, 2 \leq j \leq 10, 4 \leq k \leq 20, \quad (3')$$
$$3 \leq i + j, h + i + j + k = 100.$$

Also, for the same purpose, there is provided a soft magnetic alloy film containing fine grains of Fe based materials in which at least the nitrogen composition is modulated in the direction of film thickness and the average composition of the film is represented by the general formula, $$M_hX_iZ_jN_k \quad (3)$$

where M is Fe, X is one or more metals selected from Nb and Ta, Z is one or more metals selected from Zr, Ti, and Hf, N is nitrogen, and h, i, j, and k are numerals in atomic % and determined by:

$$65 \leq h \leq 89.3, 0 \leq i \leq 5, 2 \leq j \leq 10, 4 \leq k \leq 20, \quad (3')$$
$$3 \leq i + j, h + i + j + k = 100.$$

Furthermore, for the same purpose, there is provided a soft magnetic alloy film, the composition of which has been modulated in the direction of film thickness at least during the deposition of the alloy film and the average composition of the film is represented by the general formula, $$M_lA_mZ_nN_p \quad (4)$$

where M is Fe, A is one or more metals selected from V, Mn, Cr, and Cu, Z is Zr, N is nitrogen, and l, m, n, and p are numerals in atomic % and determined by:

$$74.4 \leq l \leq 89.3, 0 \leq m \leq 5, 3 \leq n \leq 10, 4 \leq p \leq 20, \quad (4')$$
$$l + m + n + p = 100.$$

For the same purpose, there is provided a soft magnetic alloy film containing fine grains of Fe based materials in which at least the compositional arrangement of nitrogen is modulated in the direction of film thickness and the average layer compositional arrangement is represented by the general formula, $$M_lA_mZ_nN_p \quad (4)$$

where M is Fe, A is one or more metals selected from V, Mn, Cr, and Cu, Z is Zr, N is nitrogen, and l, m, n, and p are numerals in atomic % and determined by:

$$74.4 \leq l \leq 89.3, 0 \leq m \leq 5, 3 \leq n \leq 10, 4 \leq p \leq 20, \quad (4')$$
$$l + m + n + p = 100.$$

The soft magnetic alloy film employing an alloy material expressed by the general formula (1), (2), (3), or (4) will be enhanced in the soft magnetic property when the wavelength of compositional modulation in the direction of film thickness is less than 60 nm.

The soft magnetic alloy film according to the present invention is a nitride film of Fe based alloy containing one or more metallic elements selected from Nb, Ta, Zr, Ti, and Hr. However, it is not a simple nitride film but a compositionally modulated nitride alloy film having a multi-layer construction comprising nitride layers containing a higher content of nitrogen and non-nitride layers containing less nitrogen, more particularly, in which at least the nitrogen content is compositionally modulated in the direction of film thickness after the deposition of the alloy film by a sputtering procedure. While the nitrogen content is compositionally modulated, the composition of other elements in the compositionally modulated nitride alloy film is also modulated relatively. The sum of the thickness of a nitride layer and the thickness of a non-nitride layer is designated as a wavelength of compositional modulation measured in the direction of film thickness. The wavelength of compositional modulation is controlled by varying the period of mixing of nitrogen gas ($N_2$) with a sputtering gas during the sputtering. The ratio of the nitrogen gas to the sputtering gas or a nitrogen gas partial pressure ratio Pn (%) is obtained from:

Pn (%) = 100 × (nitrogen gas partial pressure)/(total sputtering gas pressure).

The compositionally modulated nitride alloy film exhibits a distinct compositional modulation and is precise or close to amorphous phase just after the deposition of the film. The destinct compositional modulation is then shifted to an unclear compositionally modulated form as the nitrogen content is dispersed by annealing at a high temperature of more than 300° C. and after annealing, will contain fine grains of Fe based materials such as α-Fe. As the result of annealing, the compositionally modulated nitride alloy film of the present invention in which the compositional modulation is changed will have a better soft magnetic property exhibiting higher saturation magnetization and with a specific average composition according to the present invention, ensuring lower magnetostriction. The substantial condition to provide improved soft magnetic characteristics after annealing is such that the nitrogen content is at least compositionally modulated in the direction of film thickness during the deposition of an alloy film by a sputtering procedure or that fine grains of Fe based materials are contained while the nitrogen content has been modulated compositionally after annealing. The wavelength of compositional modulation is preferably less than 60 nm for having a better soft magnetic property.

The soft magnetic alloy film of the present invention contains Fe less affinitive to nitrogen and a metallic element, e.g. Nb, Ta, Zr, Ti, or Hf, which has a high affinity to nitrogen. In the alloy film, the metallic element such as Nb or Zr is selectively bonded to the nitrogen in chemical relationship. This is an important factor for providing the thermal stability after annealing for improvement in the soft magnetic property. For having a better soft magnetic property and providing higher saturation magnetization, the average composition in the compositionally modulated nitride alloy film of the present invention preferably includes more than 3 atomic % of one or more metallic elements selected from Nb, Ta, Zr, Ti, and Hf, more than 3 atomic % of nitrogen, and less than 92 atomic % of Fe. Also, for particularly enhancing the saturation magnetization, the content of Fe is desirably more than 60 atomic % and the contents of a metallic element such as Nb or Zr and nitrogen are less than 20 and 25 atomic % respectively. Such preferred average composition is represented by the formulas (1) and (1'). If Fe is a main component, it can partially be replaced with Co or Ni. Also, it will be acceptable that a small amount of oxygen is inevitably contained in the alloy film during the sputtering process, because a small amount of oxygen gas is contained in the sputtering chamber or in Ar or $N_2$ gas.

For having a soft magnetic property showing lower magnetostriction with the use of one of the foregoing average composition, three of specified average composition represented by the formulas (2), (3), and (4) are preferably employed.

First, when the average composition of a film is expressed as the general formula (2) or (2'), the content e of the metal X representing one or more metallic elements selected from Nb and Ta is $9 \leq e \leq 15$ (atomic %) and the content g of nitrogen is $3 \leq g \leq 20$ (atomic %). If the content e of e.g. Nb or Ta or the content g of nitrogen is more increased and the content d of Fe denoted by the letter M is further reduced, the magnetostriction will be enhanced to a negative end and also, the saturation magnetization will be declined. In reverse, if the contents e and g are more decreased and the content d is further increased, the magnetostriction will be shifted to a positive end thus diminishing the better soft magnetic property. For improving thermal stability in the soft magnetic property, it is preferred to add a content f of the metal Z and more particularly, less than 3 atomic of one or more metallic elements selected from Zr, Ti, and Hf which will lower the magnetostriction. This extra composition is shown in the general formula (2').

Secondly, when the average composition of a film is expressed as the general formula (3) or (3'), the content j of the metal Z representing one or more metallic elements selected from Zr, Ti, and Hf is $2 \leq j \leq 10$ (atomic %) and the content k of nitrogen is $3 \leq k \leq 20$ (atomic %). If the content j of e.g. Zr, Ti, or Hf or the content k of nitrogen is more increased and the content h of Fe denoted by the letter M is further reduced, the magnetostriction will be enhanced to a positive end. In reverse, if the contents j and k are more decreased and the content h is further increased, the magnetostriction will be shifted to a negative end thus diminishing the better soft magnetic property. For improving the resistance to corrosion in addition to low magnetostriction, it is preferred to add a content i of the metal X and more particularly, less than 6 atomic % of one or more metallic elements selected from Nb and Ta. However, for ensuring the better soft magnetic property, the sum content of one or more metallic elements selected from Zr, Ti, Hf, Nb, and Ta should be more than 3 atomic % and thus, $3 \leq i+j$ is needed in the formula (3). This arrangement is shown in the general formula (3').

Thirdly, when the average composition of a film is expressed as the general formula (4) or (4'), the content n of Zr is $3 \leq e \leq 10$ (atomic %) and the content p of nitrogen is $3 \leq p \leq 20$ (atomic %). If the content n of Zr or the content p of nitrogen is more increased and the content l of Fe denoted by the letter M is further reduced, the magnetostriction will be enhanced to a positive end. In reverse, if the contents n and p are more decreased and the content l is further increased, the magnetostriction will be shifted to the negative end thus diminishing the better soft magnetic property. When less than 10 atomic % of the metal A representing one or more metallic elements selected from V, Mn, Cr, and Cu is added, the magnetostriction will be declined. The extra arrangement is shown in the general formula (4').

The soft magnetic alloy film of the present invention developed by the aforementioned manner will have a better soft magnetic property provided after annealing and exhibit higher saturation magnetization and minimum magnetostriction.

DESCRIPTION OF THE PREFERRED EMBODIMENTS

Example 1

This example illustrating a first embodiment of the present invention will be described.

Using a sputtering deposition procedure, a multilayer film or a compositionally modulated nitride alloy film consisting of 10 nm-thick nitride layers and 10 nm-thick non-nitride layers alternately laminated in the direction of a film thickness was deposited on a substrate of ceramic material by periodically mixing a nitrogen gas ($N_2$) with an argon gas (Ar) during the sputtering deposition with the use of a target composition expressed as $Fe_{88}Nb_{12}$ (in atomic %). The compositionally modulated nitride alloy film is designated as a soft magnetic alloy film according to the present invention. Also, for the purpose of comparison, a non-nitride film was prepared by the sputtering procedure in an argon gas, no nitrogen gas added, with the use of the same target composition. For the same purpose, a single-layer nitride film was prepared in a mixture of nitrogen gas and argon gas during the sputtering with the same target. The thickness of each alloy film was 1 to 1.5 μm. Each alloy film having a different layer arrangement was then annealed in the magnetic field.

Figure 1:
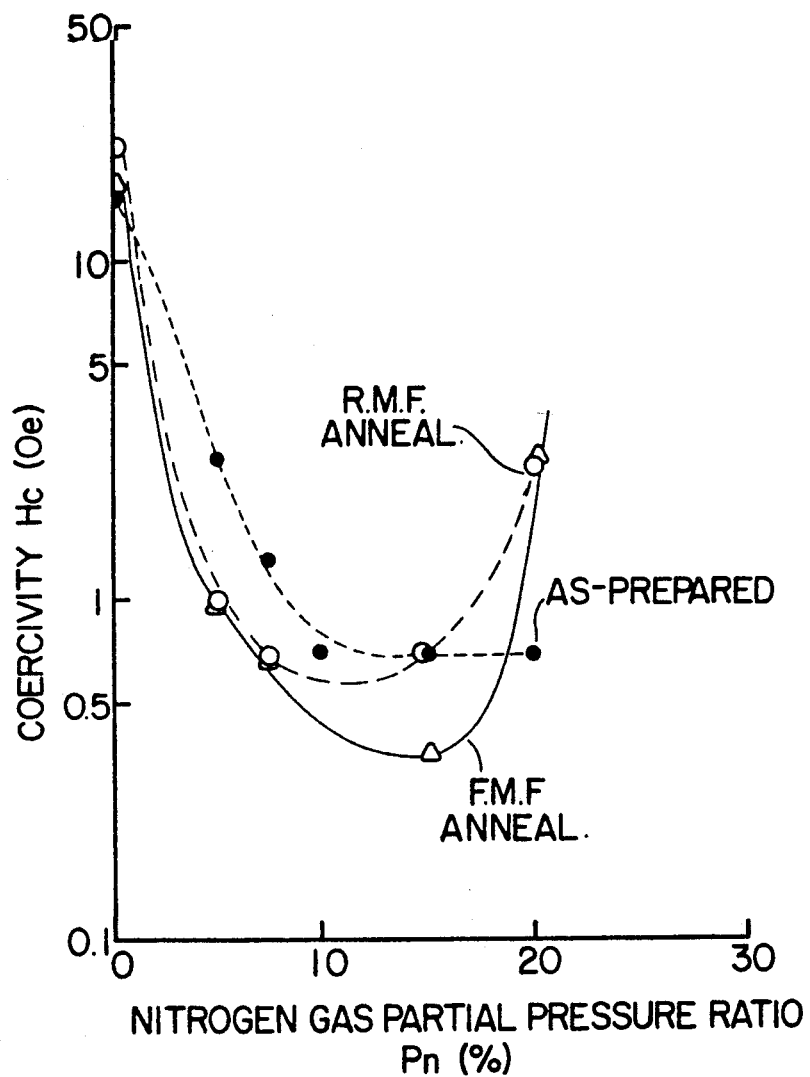
FIG. 1 is a graphic diagram showing the dependence of coercivity on nitrogen gas partial pressure ratio in a soft magnetic alloy film according to the present invention and in a comparative soft magnetic alloy film.

FIG. 1 illustrates the relation between nitrogen gas partial pressure ratio (Pn) and coercivity (Hc) in the compositionally modulated nitride alloy film during sputtering. As shown in FIG. 1, Pn=0 (%) represents the non-nitride alloy film and as-prepared means that the alloy film is not annealed after the sputtering procedure. Also, RMF anneal and FMF anneal represent the alloy films annealed at 500° C. for one hour, after developed by the sputtering procedure, in the rotating and fixed magnetic fields respectively. As apparent from FIG. 1, the compositionally modulated nitride alloy film which was annealed at 500° C. for an hour in either the rotating or fixed magnetic field exhibits a better soft magnetic characteristic within a range of $5 \leq Pn \leq 20$ (%) while the non-nitride film (Pn=0%) prepared for comparison provides a higher coercivity of more than 10 (Oe) regardless of heat-up procedure, failing to show a satisfactory soft magnetic characteristic. The single-layer nitride film of Pn>5 (%) prepared for comparison, was found inferior in the soft magnetic characteristic and the single-layer nitride film of $Pn \leq 5$ (%) showed considerably the soft magnetic chracteristic.

Figure 2:
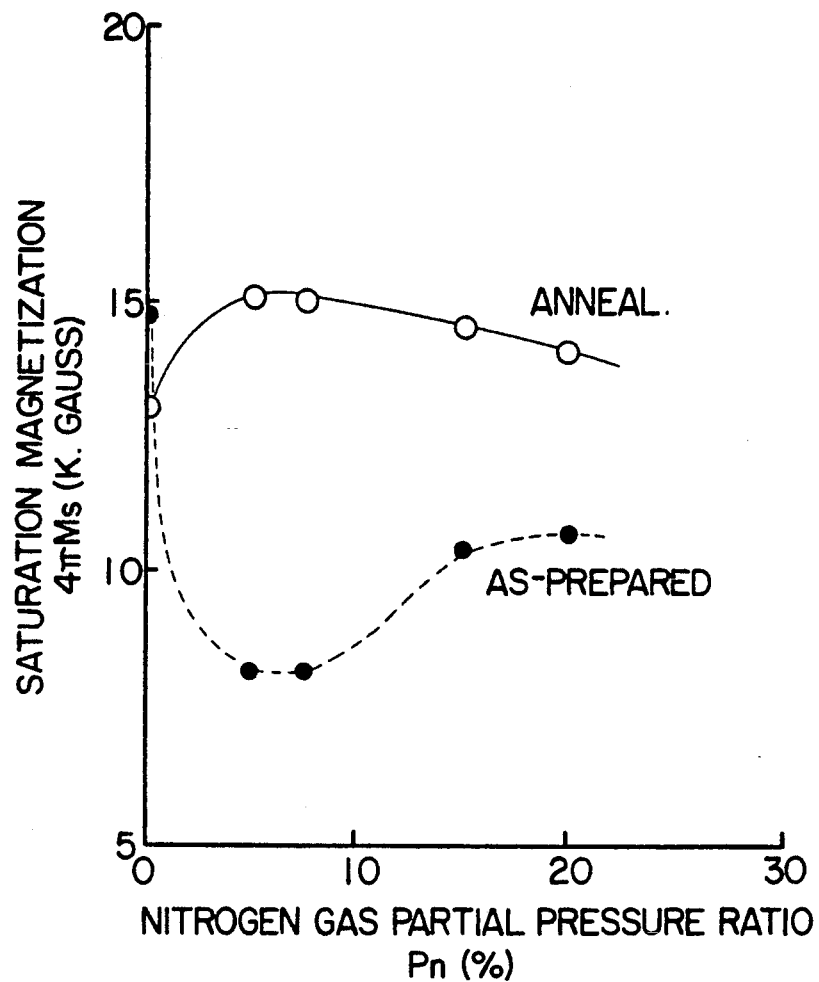
FIG. 2 is a graphic diagram showing the dependence of saturation magnetization on nitrogen gas partial pressure ratio in a soft magnetic alloy film according to the present invention and in a comparative soft magnetic alloy film.

FIG. 2 illustrates the dependence of saturation magnetization ($4\pi Ms$) on a nitrogen gas partial pressure ratio (Pn) in the compositionally modulated nitride alloy film of FIG. 1. Also, the alloy film of Pn=0 (%) represents a non-nitride film and of Pn>0 (%) represents a compositionally modulated nitride alloy film. The as-prepared alloy film shows 8 to 11 k Gauss of saturation magnetization and the anneal. Alloy film annealed at 500° C. for an hour exhibits as high as 15 k Gauss in the saturation magnetization.

The wavelength of compositional modulation in a compositionally modulated nitride alloy film is defined by a sum of the thickness of a nitride layer and the thickness of a non-nitride layer. Each of the compositionally modulated nitride alloy films shown in FIGS. 1 and 2 is a multi-layer film consisting of 10 nm-thick nitride layers and 10 nm-thick non-nitride layers alternately laminated, hence having a compositionally modulated wavelength of 20 nm. The average composition of alloy films of Pn=10 (%) shown in FIGS. 1 and 2 is expressed as $Fe_{77}Nb_{10}N_{13}$ obtained from an analysis of Rutherford back scattering spectrometry.

Figure 3:
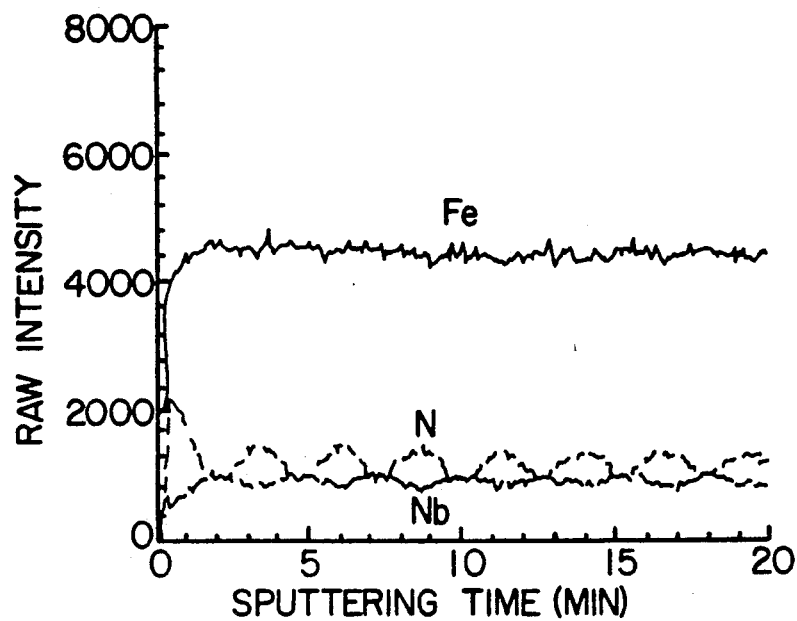
FIGS. 3 and 4 are depth profile diagrams of the content of elements in the soft magnetic alloy film of the present invention before and after heat treatment.
Figure 4:
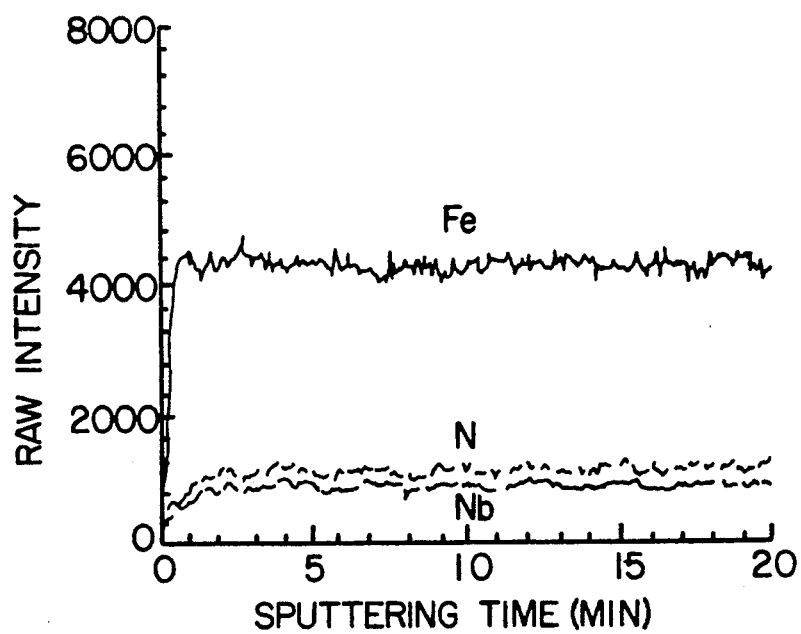

Change of coercivity and saturation magnetization, before and after annealing, seems to have a close relation to the structural change of the compositionally modulated nitride alloy film. FIGS. 3 and 4 are diagrams showing the depth profile of Fe, Nb, and N element contents in the compositionally modulated nitride alloy film (Pn=15%) of Example 1, which were measured from the surface of the film in the direction of thickness by means of Auger electron spectroscopy. FIG. 3 illustrates the depth profile of an as-prepared film and FIG. 4 illustrates the same of the alloy film annealed at 500° C. for an hour. The compositionally modulated nitride alloy film has a definite compositional arrangement prior to the annealing as specifically profiled with nitrogen element. After annealing, the compositional arrangement of the film is turned ambiguous but yet remains modulated a little in the thickness direction. The compositionally modulated nitride alloy film of the present invention exhibits a higher saturation magnetization and a better soft magnetic characteristic after its compositional arrangement becomes ambiguous, as shown in FIG. 4. It is, however, necessary for nitride alloy film to show soft magnetic properties, that the alloy film should be deposited such that composition of the alloy film is modulated in the thickness direction thereof because single layer nitride film prepared with Pn>5% could never exceed the compositionally modulated nitride alloy film in soft magnetic properties under any investigated conditions of annealing. The compositional change after annealing may result from the selective binding of Nb with nitrogen element. Hence, the soft magnetic alloy film or compositionally modulated nitride alloy film according to the present invention should contain more than 3% of nitrogen and more than 3% of metallic element, e.g. Nb, Ta, Zr, Ti, or Hf, which has a higher affinity for nitrogen. While the as-prepared nitride alloy film remains amorphous or close to amorphous phase, the annealed nitride alloy film contains Fe based fine grains of e.g. α-Fe as detected using an X-ray diffractometry procedure. Therefore criterion that the nitride alloy film can have soft magnetic properties after annealing is that the alloy film is deposited such that the content of the alloy film is modulated in the thickness direction thereof, or that at least the nitrogen content is compositionally modulated in the thickness direction and the film contains fine grains of F based materials.

The soft magnetic alloy film of Example 1 or the compositionally modulated Fe based nitride alloy film has a better soft magnetic characteristic exhibiting 15 k Gauss of saturation magnetization and less than 1 Oe of coercive force and more particularly, can obtain the same after annealing at least at 500° C. for one hour.

Using the target of $Fe_{88}Nb_{12}$, compositionally modulated nitride alloy films were deposited by a sputtering procedure which was different in the nitrogen gas partial pressure ratio and the wavelength of compositional modulation and then, annealed at a high temperature. The measurements of coercivity are listed in Table 1 explaining the comparison between the compositionally modulated nitride alloy films of the present invention and the aforementioned comparative films.

TABLE 1

| Specimen No. | Nitrogen partial pressure ratio during sputtering (%) | Wavelength of compositional modulation (mm) | Coercivity (Oe) |
| --- | --- | --- | --- |
| Example | | | |
| 1 | 10 | 20 | 0.6 |
| 2 | 10 | 40 | 0.8 |
| 3 | 10 | 60 | 1.0 |
| Comparison | | | |
| 4 | 10 | 80 | 1.6 |
| 5 | 15 | 80 | 1.4 |
| 6 | 10 | 100 | 2.0 |

As Shown in Table 1, the compositionally modulated nitride alloy films denoted 1 to 3 according to the present invention has a better soft magnetic characteristic exhibiting a low coercivity. As compared with the alloy films of Comparisons 4 to 6, the wavelength of compositional modulation in the compositionally modulated nitride alloy film having a better soft magnetic characteristic is preferably less than 60 nm. Apparently, each of the compositionally modulated Fe based nitride alloy films in this Example has a compositionally modulated wavelength of less than 60 nm thus showing a better soft magnetic characteristic.

Example 2

Example 2 of the present invention will now be described.

A variety of soft magnetic alloy films or compositionally modulated Fe based nitride alloy films which are different in the average composition were prepared and annealed under optimum conditions. Table 2 shows the relation between wavelength of compositional modulation and magnetic characteristics after annealing of the soft magnetic alloy films having different average composition.

TABLE 2

| Specimen No. | Average composition (Atomic %) | Wavelength of compositional modulation (mm) | Saturation magnetization (kG) | Coercivity (Oe) |
|---|---|---|---|---|
| 7 | $Fe_{79}Nb_{11}N_{10}$ | 20 | 15 | 0.6 |
| 8 | $Fe_{84}Nb_8N_8$ | 20 | 17 | 0.8 |
| 9 | $Fe_{78}Nb_9Ta_4N_9$ | 40 | 14 | 0.7 |
| 10 | $Fe_{76}Ta_{11}N_{13}$ | 20 | 14 | 0.6 |
| 11 | $Fe_{70}Zr_{17}Nb_{13}$ | 20 | 13 | 0.3 |
| 12 | $Fe_{74}Ti_{13}N_{13}$ | 20 | 14 | 0.7 |

As Shown in Table 2, the average composition in each soft magnetic alloy film substantially consists of a first element of Fe, a second element selected from Nb, Ta, Zr, and Ti, and a third element of N. It is thus understood that the soft magnetic alloy film of the present invention can have a better magnetic property within a wide range of the average composition.

Example 3

Example 3 of the present invention will then be described.

Figure 5A:
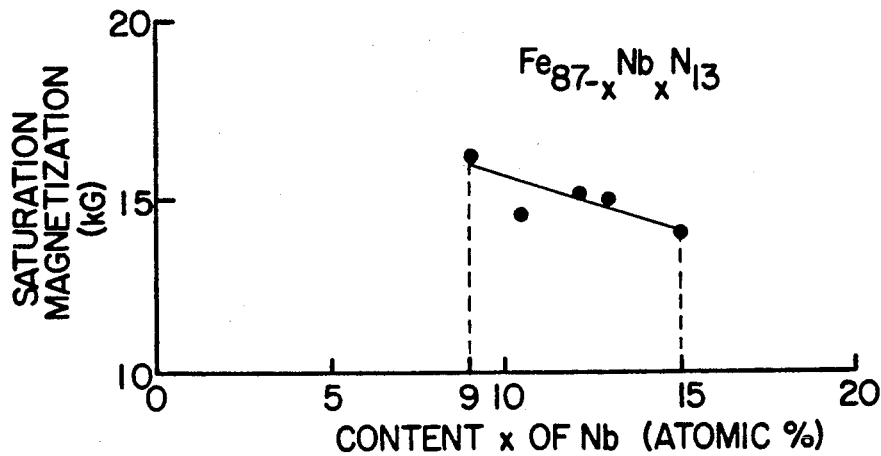
FIGS. 5a, 5b, 5c, 6a, 6b, 6c, 8a, 8b, 8c, 9a, 9b, and 9c are graphic diagrams showing the dependence of magnetic characteristics on average composition in the soft magnetic alloy film of the present invention.
Figure 5B:
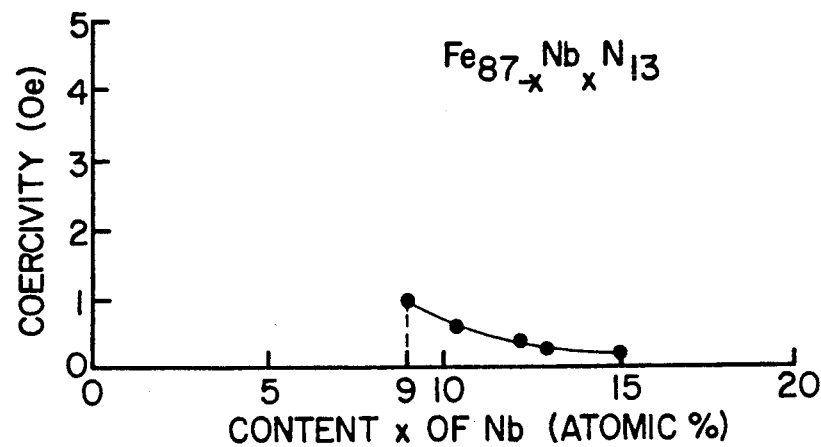
Figure 5C:
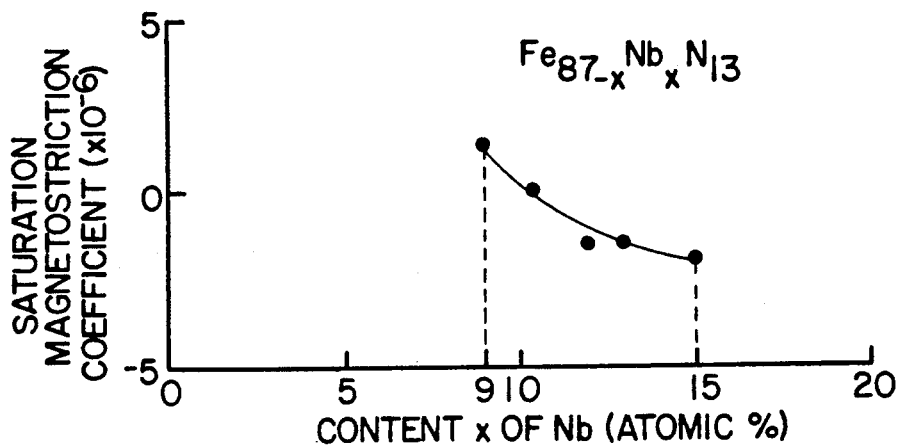

Using a procedure of rapid-frequency sputtering deposition, a plurality of multi-layer film or compositionally modulated nitride alloy films, each consisting of 10 nm-thick nitride layers and 10 nm-thick non-nitride layers overlaid periodically in the direction of a film thickness and being deposited on a substrate of ceramic material by periodically mixing 1.2 mm Torr of nitrogen gas ($N_2$) with 10.8 mm Torr of argon gas (Ar) during the sputtering deposition, were prepared from various targets of different Fe-Nb binary alloys. The nitrogen gas partial pressure ratio Pn was 10% and the wavelength of compositional modulation λ was 20 nm. Because the content of nitrogen in the nitride alloy film can be measured by a Rutherford back scattering spectrometry procedure or an X-ray photoelectron spectroscopy procedure with unsatisfactory precision, decimal fractions of the numerals in an average compositional representation will be disregarded hereinafter. In this Example, the average composition of a film in the compositionally modulated nitride alloy film developed at Pn=10 (%) from the target alloy of $Fe_{88}Nb_{12}$ is expressed as $Fe_{77}Nb_{10}N_{13}$ detected by the Rutherford scattering procedure and will hence be denoted by a formula, $Fe_{87-x}Nb_xN_{13}$. The compositionally modulated nitride alloy films were then annealed in a magnetic field at 600° C. for 60 minutes. FIG. 5 shows the dependence of magnetic characteristics on a content of Nb in the compositionally modulated nitride alloy film having an average composition of $Fe_{87-x}Nb_xN_{13}$. When the Nb content x is $9 \leq x \leq 15$ (atomic %), the saturation magnetization is more than 13 kG and the coercive force is less than 1 Oe. The coefficient of saturation magnetostriction λs will be positive if the Nb content is low and negative if high. When $9 \leq x \leq 15$ (atomic %), the absolute value of the saturation magnetostriction coefficient is a low as less than $3 \times 10^{-6}$. This phenomenon will appear not only on the compositionally modulated Fe-Nb-N nitride alloy film but also on the compositionally modulated Fe-Ta-N nitride alloy film. For example, the compositionally modulated nitride alloy film having an average composition of $Fe_{76}Ta_{11}N_{13}$, after annealing at 550° C., was measured 14 kG in the saturation magnetization, 0.6 (Oe) in the coercivity, and less than $-1 \times 10^{-6}$ in the magnetostriction. Also, the compositionally modulated nitride alloy film having an average composition of $Fe_{78}Nb_9Ta_4N_9$, after annealing at 550° C., was measured 14 kG in the saturation magnetization, 0.7 (Oe) in the coercivity, and less than $1 \times 10^{-6}$ in the magnetostriction.

Figure 6A:
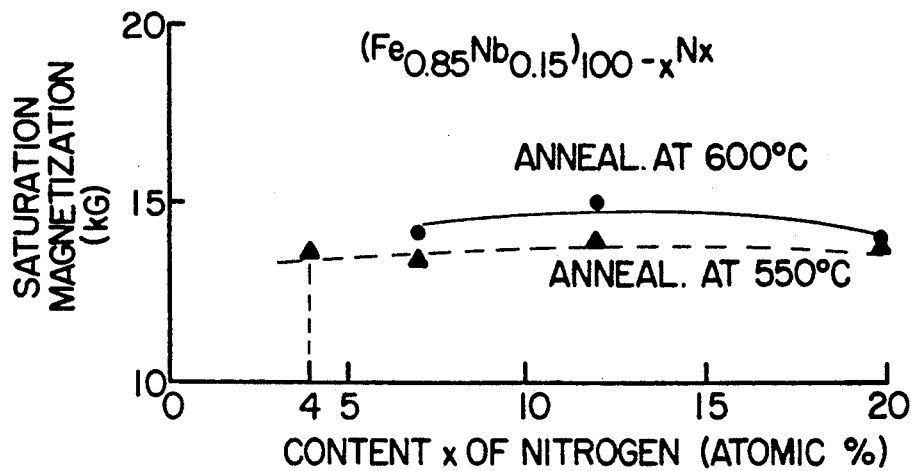
Figure 6B:
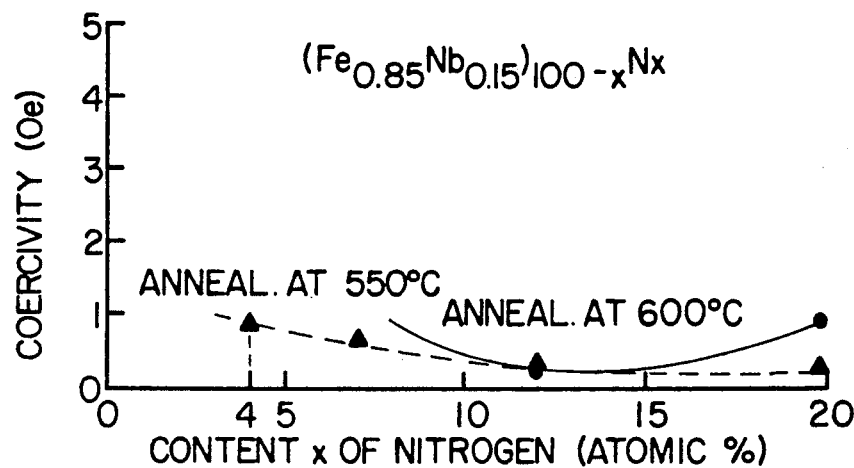
Figure 6C:
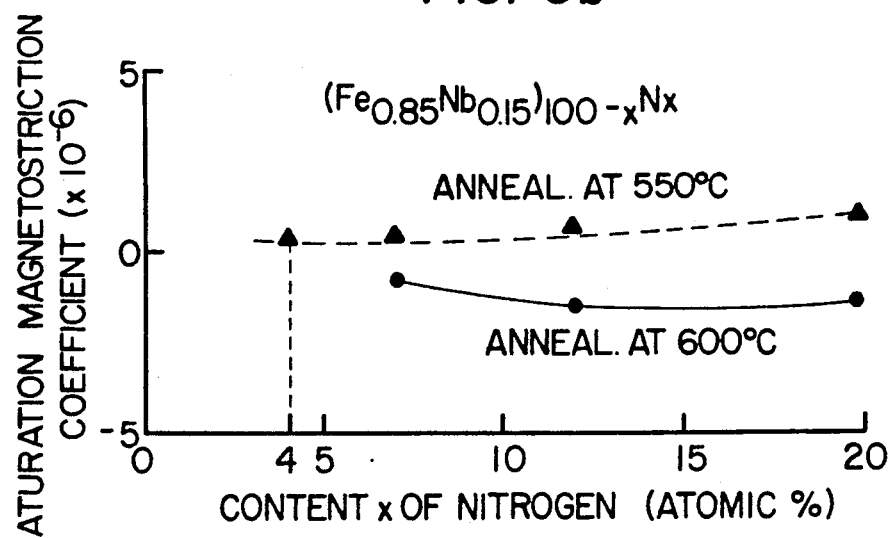

Then, using a target alloy of $Fe_{85}Nb_{15}$, two compositionally modulated nitride alloy films in which the wavelength of compositional modulation is 20 nm and the average composition is expressed as $(Fe_{0.85}Nb_{0.15})_{100-x}N_x$ were prepared by the sputtering at a sputtering gas pressure of 12 mm Torr and with a ratio of argon gas partial pressure to nitrogen gas partial pressure being varied and then, annealed for 60 minutes at 550° C. and 600° C. respectively. FIG. 6 shows the dependence of magnetic characteristics on a content of nitrogen in the compositionally modulated nitride alloy films having an average layer composition of $(Fe_{0.85}Nb_{0.15})_{100-x}N_x$. As apparent from FIG. 6, both the compositionally modulated nitride alloy films which were annealed at an appropriate temperature of 550° C. to 600° C. exhibit higher saturation magnetization, lower coercivity, and lower magnetostriction when the nitrogen content x is more than 3 atomic % and less than 20 atomic %.

Figure 7:
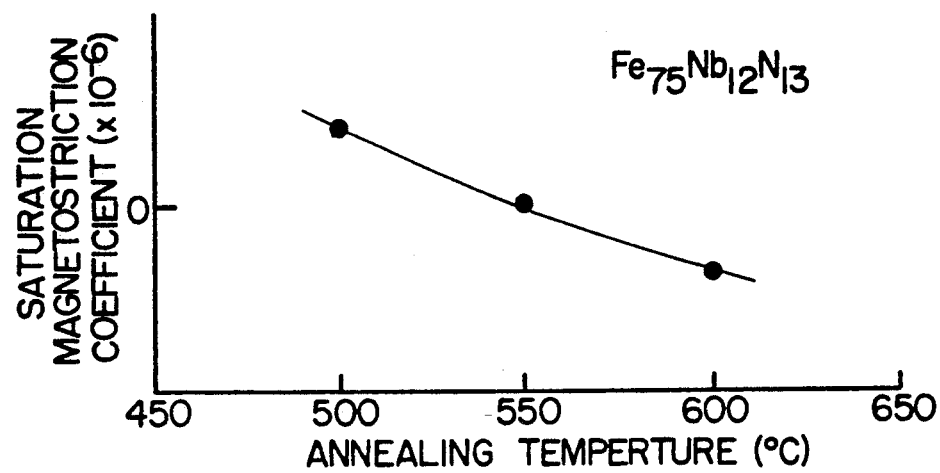
FIGS. 7 and 10 are graphic diagrams showing the dependence of saturation magnetostriction coefficient on temperature for the heat treatment in the soft magnetic alloy film of the present invention.

As the above films are annealed at a given temperature, the saturation magnetostriction coefficient in a compositionally modulated nitride alloy film will vary with the annealing temperature. FIG. 7 illustrates the dependence of a saturation magnetostriction coefficient on an annealing temperature in the compositionally modulated nitride alloy film having an average composition of $Fe_{75}Nb_{12}N_{13}$. Apparently, the magnetostriction coefficient associated with the foregoing composition is shifted from positive to egative as the annealing temperature increases. More particularly, the magnetostriction becomes nil after annealing at about 550° C. Accordingly, the annealing temperature is also an important factor for providing lower magnetostriction on the compositionally modulated nitride alloy film. When the average composition in a compositionally modulated nitride alloy film is within the scope of the present invention, lower magnetostriction will be ensured by selectively determining the annealing temperature.

Similarly, using a target alloy of $Fe_{88}Nb_{12}$, compositionally modulated nitride alloy films were prepared at Pn=10 (%) which are different in the wavelength of compositional modulation. No noticeable change in the saturation magnetization and the saturation magnetostriction coefficient was detected even when the wavelength of compositional modulation was varied. However, the coercivity was decreased as the wavelength of compositional modulation becomes short and a desired magnetic characteristic was acquired when the wavelength was less than 60 nm.

As described above, the Fe-based compositionally modulated nitride alloy film containing 3 to 15 atomic % of a metallic material composed of one or more elements selected from Nb and Ta and 3 to 20 atomic % of nitrogen exhibits a better soft magnetic property ensuring not only higher saturation magnetization but also lower magnetostriction. For comparison with the compositionally modulated Fe-(Nb,Ta)-N nitride alloy film shown in Table 3 are some average composition in their respective compositionally modulated nitride alloy films which were added with one or more similar metallic elements selected from Zr, Ti, and Hf for improvement in the thermal stability of soft magnetic characteristic and the magnetic characteristic of the same provided after annealing at 500° to 600° C.

TABLE 3

| Specimen No. | Average composition (Atomic %) | Saturation magnetization (kG) | Coercivity (Oe) | Saturation magnetostriction coefficient ($\times 10^{-6}$) |
|---|---|---|---|---|
| 13 | $Fe_{69}Nb_{10}Zr_1N_{20}$ | 13.9 | 0.6 | 0.8 |
| 14 | $Fe_{72}Nb_{12}Zr_3N_{13}$ | 13.2 | 0.3 | 0 |
| 15 | $Fe_{81}Nb_{11}Zr_1N_7$ | 14.5 | 0.7 | 0.4 |
| 16 | $Fe_{73}Nb_{12}Ti_2N_{13}$ | 14.1 | 0.2 | −0.3 |
| 17 | $Fe_{75}Ta_{11}Zr_1N_{13}$ | 14.2 | 0.2 | −0.5 |

The compositionally modulated nitride alloy films shown in Table 3 exhibit higher saturation magnetization, lower coercivity, and lower magnetostriction involving an absolute value of less than $1 \times 10^{-6}$. The annealing for a compositionally modulated nitride alloy film after deposition can be controlled for approximating the magnetostriction to zero by increasing an annealing temperature if the magnetostriction is positive and reducing the sam if it is negative. Accordingly, the compositionally modulated Fe-(Nb,Ta)-N nitride alloy film added with one or more metallic elements selected from Zr, Ti, and Hf will exhibit higher saturation magnetization and lower coercivity, ensuring minimum magnetostriction.

Example 4

Figure 8A:
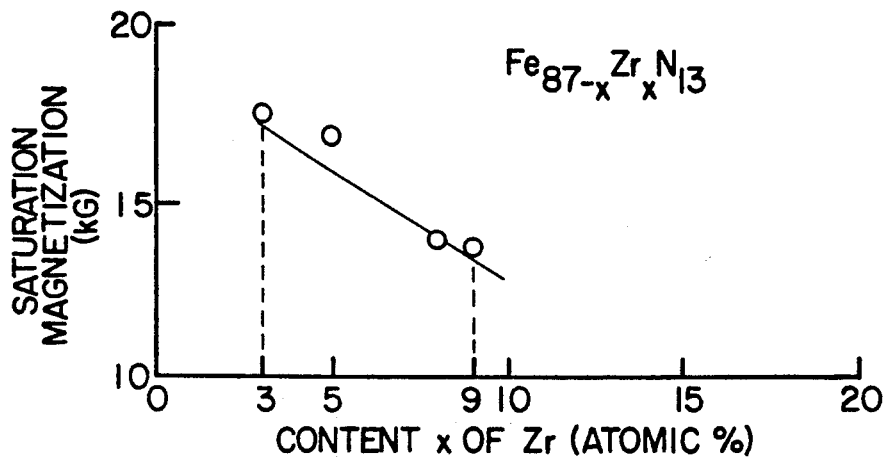
Figure 8B:
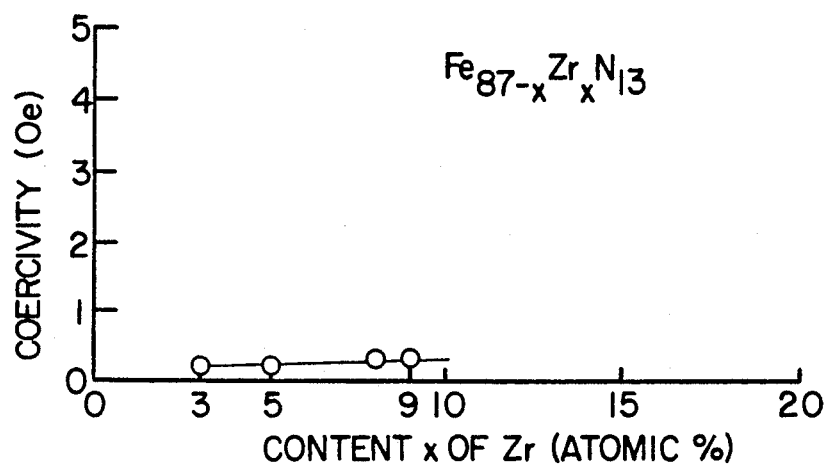
Figure 8C:
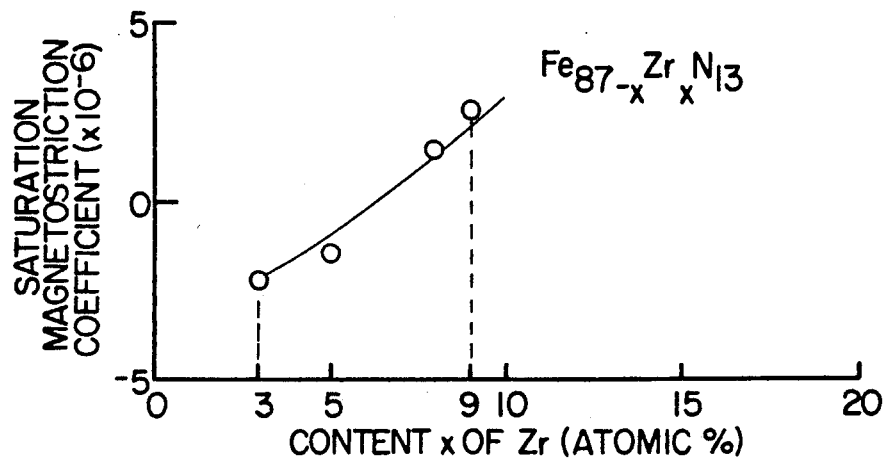

Example 4 of the present invention will be described.
Using the rapid-frequency sputtering deposition procedure, a plurality of multi-layer film or compositionally modulated nitride alloy films, each consisting of 10 nm-thick nitride layers and 10 nm-thick non-nitride layers overlaid periodically in the direction of a film thickness and being deposited on a substrate of ceramic material by periodically mixing 1.2 mm Torr of nitrogen gas ($N_2$) with 10.8 mm Torr of argon gas (Ar) during the sputtering deposition, were prepared from various targets of Fe-Nb binary alloys which are different in the content of Zr. The nitrogen gas partial pressure ratio Pn was 10% and the wavelength of compositional modulation $\lambda$ was 20 nm. The average composition in each compositionally modulated nitride alloy film is expressed as $Fe_{87-x}Zr_xN_{13}$. The compositionally modulated nitride alloy films were then annealed in a magnetic field at 600° C. for 60 minutes. FIG. 8 shows the dependence of magnetic characteristics on a content of Zr in the compositionally modulated nitride alloy film having an average composition of $Fe_{87-x}Zr_xN_{13}$ and annealed. When the Zr content x is $3 \leq x \leq 10$ (atomic %), the saturation magnetization is more than 13 kG and the coercivity is less than 1 Oe. The coefficient of saturation magnetostriction will be negative if the Zr content is low and positive if high, just in reverse of the Fe-Nb-N film. When $3 \leq x \leq 10$ (atomic %), the absolute value of the saturation magnetostriction coefficient is as low as less than $3 \times 10^{-6}$. This phenomenon will appear not only on the compositionally modulated Fe-Zr-N nitride alloy film but also on the compositionally modulated Fe-Ti-N or Fe-Hf-N nitride alloy films. For example, the compositionally modulated nitride alloy film having an average composition of $Fe_{70}Ti_{10}N_{20}$, after annealing at 650° C., was measured 14 kG in the saturation magnetization, 0.9 (Oe) in the coercivity, and less than $2 \times 10^{-6}$ in the magnetostriction. Also, the compositionally modulated nitride alloy film having an average composition of $Fe_{80}Hf_7N_{13}$, after annealing at 600° C., was measured 14 kG in the saturation magnetization, 0.4 (Oe) in the coercivity, and less than $1 \times 10^{-6}$ in the magnetostriction.

Figure 9A:
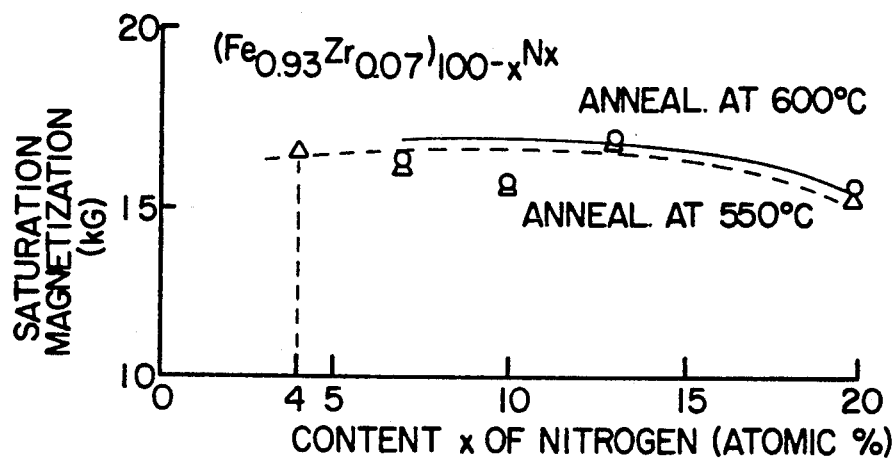
Figure 9B:
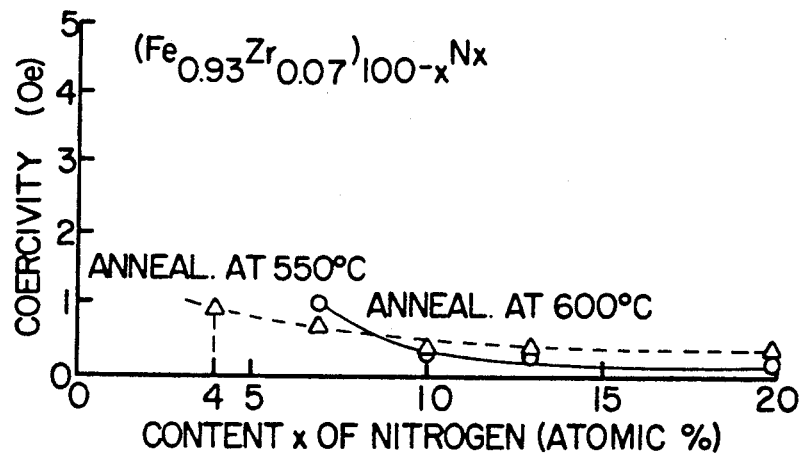
Figure 9C:
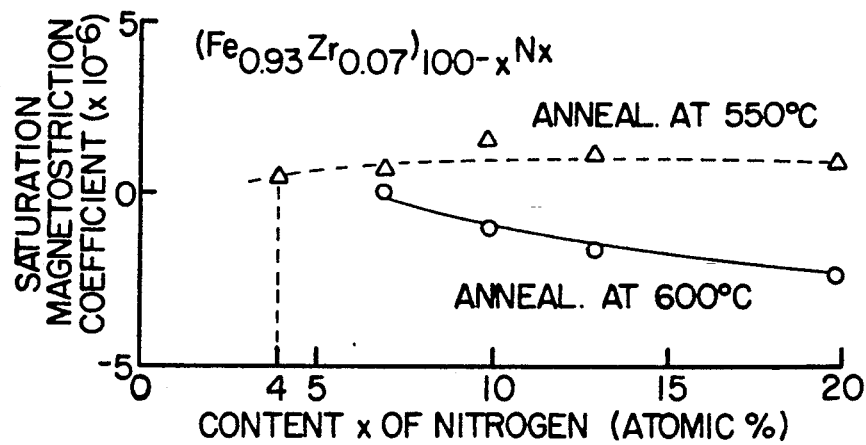

Then, using a target alloy of $Fe_{93}Zr_7$, two compositionally modulated nitride alloy films in which the composition ally modulated wavelength is 20 nm and the average composition is expressed as $(Fe_{0.93}Zr_{0.07})_{100-x}N_x$ were prepared by the sputtering at a sputtering gas pressure of 12 mm Torr and with a ratio of argon gas partial pressure to nitrogen gas partial pressure being varied and then, annealed for 60 minutes at 550° C. and 600° C. respectively. FIG. 9 shows the dependence of magnetic characteristics on a content of nitrogen in the compositionally modulated nitride alloy films having an average composition of $(Fe_{0.93}Zr_{0.07})_{100-x}N_x$. As apparent from FIG. 9, both the compositionally modulated nitride alloy films which were annealed at an appropriate temperature of 550° C. to 600° C. exhibit higher saturation magnetization, lower coercivity, and lower magnetostriction when the nitrogen content x is more than 3 atomic % and less than 20 atomic %.

Figure 10:
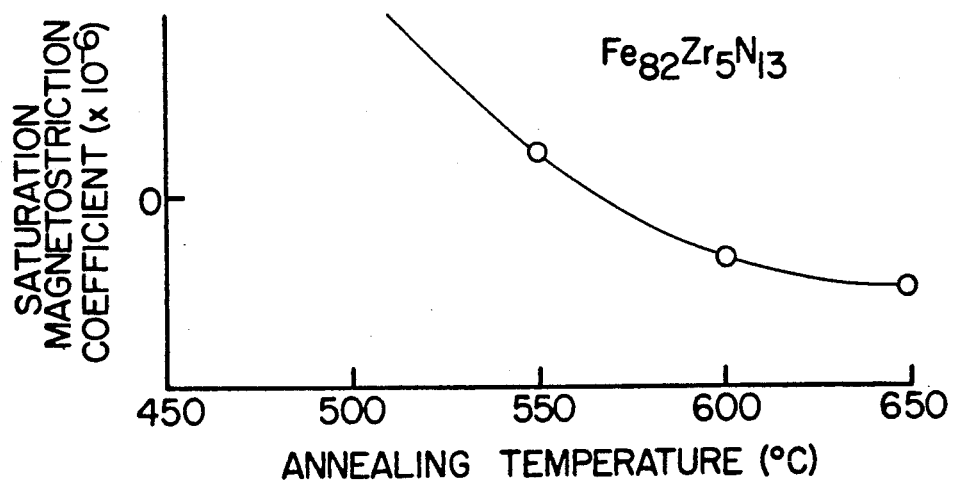

As the above films are annealed at a given temperature, the saturation magnetostriction coefficient in a compositionally modulated nitride alloy film will vary with the temperature of annealing. FIG. 10 illustrates the dependence of a saturation magnetostriction coefficient on a temperature for annealing in the compositionally modulated nitride alloy film having an average composition of $Fe_{82}Zr_5N_{13}$. Apparently, the magnetostriction coefficient associated with the foregoing composition is shifted from positive to negative as the temperature for annealing increases. More particularly, the magnetostriction becomes nil after the annealing at about 550° C. to 600° C. Accordingly, the temperature for annealing is also an important factor for providing lower magnetostriction on the compositionally modulated nitride alloy film. When the average composition in a compositionally modulated nitride alloy film is within the scope of the present invention, lower magnetostriction will be ensured by selectively determining the temperature for annealing.

Similarly, using a target alloy of $Fe_{93}Zr_7$, compositionally modulated nitride alloy films which are different in the wavelength of compositional modulation were prepared at Pn=10 (%) in the nitrogen gas partial pressure ratio. No noticeable change in the saturation magnetization and the saturation magnetostriction coefficient was detected even when the wavelength of compositional modulation was varied. However, the coercivity was decreased as the wavelength of compositional modulation becomes short and a desired magnetic characteristic was acquired when the wavelength was less than 60 nm.

As described above, the Fe-based compositionally modulated nitride alloy film containing 3 to 10 atomic % of a metallic material composed of one or more elements selected from Zr, Ti, and Hf and 3 to 20 atomic % of nitrogen exhibits a better soft magnetic property ensuring not only higher saturation magnetization but also lower magnetostriction. Shown in Table 4 are some average composition in their respective compositionally modulated nitride alloy films which were added with one or more similar metallic elements selected from Nb and Ta and the magnetic characteristics of the same provided after the annealing at 550°, 600°, or 650° C.

TABLE 4

| Specimen No. | Average composition (Atomic %) | Saturation magnetization (kG) | Coercivity (Oe) | Saturation magnetostriction coefficient ($\times 10^{-6}$) |
|---|---|---|---|---|
| 18 | $Fe_{78}Nb_1Zr_8N_{13}$ | 14.1 | 0.2 | 1 |
| 19 | $Fe_{80}Nb_3Zr_4N_{13}$ | 16.7 | 0.3 | −0.8 |
| 20 | $Fe_{80}Nb_5Zr_5N_{10}$ | 14.8 | 0.3 | −0.4 |
| 21 | $Fe_{85}Nb_3Zr_5N_7$ | 16.9 | 0.3 | 0 |
| 22 | $Fe_{65}Nb_5Ti_{10}N_{20}$ | 13.1 | 0.7 | 1 |
| 23 | $Fe_{79}Ta_3Zr_5N_{13}$ | 15.5 | 0.2 | −0.5 |
| 24 | $Fe_{83}Nb_2Zr_2N_{13}$ | 18.2 | 0.4 | −1 |

The compositionally modulated nitride alloy films shown in Table 4 exhibit higher saturation magnetization, lower coercivity, and lower magnetostriction involving an absolute value of less than $1\times 10^{-6}$. The annealing for a compositionally modulated nitride alloy film after deposition can be controlled for approximating the magnetostriction to zero by increasing annealing temperature if the magnetostriction is positive and reducing the same if it is negative. Accordingly, the compositionally modulated nitride alloy film added with one or more metallic elements selected from Nb and Ta, when the content of such an additional metallic element(s) is at least less than 6 atomic %, will exhibit higher saturation magnetization and lower coercivity, ensuring minimum magnetostriction. Also, the specimen 24 in Table 4 containing 2 atomic % of Zr can exhibit higher saturation magnetization, lower coercivity, and minimum magnetostriction on condition that the sum of Zr and Nb or Ta is more than 3 atomic %.

Example 5

Example 5 of the present invention will be described.

Using the rapid-frequency sputtering deposition procedure, a plurality of multi-layer film or compositionally modulated nitride alloy films, each consisting of 10 nm-thick nitride layers and 10 nm-thick non-nitride layers overlaid periodically in the direction of a film thickness and being deposited on a substrate of ceramic material by periodically mixing a nitrogen gas ($N_2$) with an argon gas (Ar) at a proper nitrogen gas partial pressure ratio Pn so that the total sputtering gas pressure is 12 mm Torr, were prepared from different targets of Fe-(V,Cr,Mn,Cu)-Zr three-element alloys. The compositionally modulated nitride alloy films in which the wavelength of compositional modulation is 20 nm were then annealed in a magnetic field. Table 5 illustrates some average composition in their respective compositionally modulated nitride alloy films and the magnetic characteristics of the same provided after annealing at 500°, 550°, or 600° C.

TABLE 5

| Specimen No. | Average composition (Atomic %) | Saturation magnetization (kG) | Coercivity (Oe) | Saturation magnetostriction coefficient ($\times 10^{-6}$) |
|---|---|---|---|---|
| 25 | $Fe_{82}V_5Zr_6N_7$ | 15.4 | 0.8 | 0.7 |

TABLE 5-continued

| Specimen No. | Average composition (Atomic %) | Saturation magnetization (kG) | Coercivity (Oe) | Saturation magnetostriction coefficient ($\times 10^{-6}$) |
|---|---|---|---|---|
| 26 | $Fe_{78}V_4Zr_5N_{13}$ | 15.3 | 0.2 | 1 |
| 27 | $Fe_{78}Mn_4Zr_5N_{13}$ | 15.6 | 0.2 | 0.5 |
| 28 | $Fe_{78}Cr_4Zr_5N_{13}$ | 16.2 | 1 | 1 |
| 29 | $Fe_{78}Cu_4Zr_5N_{13}$ | 15.5 | 0.4 | −0.7 |

The compositionally modulated nitride alloy films shown in Table 5 all exhibit higher saturation magnetization, lower coercivity, and lower magnetostriction involving an absolute value of less than $1\times 10^{-6}$. The annealing for a compositionally modulated nitride alloy film after deposition can be controlled for approximating the magnetostriction to zero by increasing annealing temperature if the magnetostriction is positive and reducing the same if it is negative. Although described in Example 4 are the compositionally modulated Fe-Zr-N nitride alloy films with no addition of V, Cr, Mn, Cu, or the like element, the compositionally modulated Fe-Zr-N nitride alloy film added with one or more metallic elements selected from V, Mn, Cr, and Cu will exhibit higher saturation magnetization, lower coercivity, and minimum magnetostriction when the content of Zr is from 3 atomic % and to 10 atomic % and the content of nitrogen is from 3 atomic % to 20 atomic %, thus allowing the content of an additional metallic element(s) to remain less than 10 atomic %. The addition of V to the Fe-Zr-N alloy film will offer an improvement in the machining processability, of Cr will provide an increase in the resistance to corrosion, and of Mn will facilitate the control of anisotropy. Those can selectively be used to meet the tasks.

Accordingly, the soft magnetic alloy film of the present invention has a better soft magnetic property exhibiting lower coercivity and higher saturation magnetization and ensuring minimum magnetostriction.

What is claimed is:

1. A soft magnetic alloy film deposited such that composition of the alloy film is modulated in the thickness direction thereof, an average composition of the alloy film being represented by the formula;

MaTbNc where M is Fe, T is one or more metals selected from Nb, Ta, Zr, Ti and Hf, N is nitrogen, and a, b and c are numerals in atomic % and determined by:

$65 \leq a \leq 89.3, 3 \leq b \leq 6, 4 \leq c \leq 20, a+b+c=100.$

2. A soft magnetic alloy film containing fine grains of Fe based materials in which at least the nitrogen composition is modulated in the thickness direction thereof, an average composition of the alloy film being represented by the formula:

MaTbNc where M is Fe, T is one or more metals selected from Nb, Ta, Zr, Ti and Hf, N is nitrogen, and a, b and c are numerals in atomic % and determined by:

$65 \leq a \leq 89.3, 3 \leq b \leq 6, 4 \leq c \leq 20, a+b+c=100.$

* * * * *